(12) United States Patent
Cappellotto et al.

(10) Patent No.: US 8,291,949 B2
(45) Date of Patent: Oct. 23, 2012

(54) SPOKE WHEEL

(75) Inventors: Guido Cappellotto, Arcore (IT); Fabio Alberio, Cinisello Balsamo (IT)

(73) Assignee: Alpina Raggi S.p.A., Lomagna (IT)

( * ) Notice: Subject to any disclaimer, the term of this patent is extended or adjusted under 35 U.S.C. 154(b) by 11 days.

(21) Appl. No.: 12/444,203

(22) PCT Filed: Oct. 8, 2007

(86) PCT No.: PCT/EP2007/060656
§ 371 (c)(1),
(2), (4) Date: Feb. 17, 2010

(87) PCT Pub. No.: WO2008/043734
PCT Pub. Date: Apr. 17, 2008

(65) Prior Publication Data
US 2010/0141020 A1    Jun. 10, 2010

(30) Foreign Application Priority Data
Oct. 11, 2006  (IT) .............................. PD2006A0378

(51) Int. Cl.
*B60B 21/12* (2006.01)
(52) U.S. Cl. ....................................... 152/381.5; 301/58
(58) Field of Classification Search .................... 301/58, 301/67, 68, 73, 79, 95.101, 95.104, 95.106; 152/381.5, 381.6; 29/894.31, 894.331, 894.342
See application file for complete search history.

(56) References Cited

U.S. PATENT DOCUMENTS

| | | | | |
|---|---|---|---|---|
| 1,444,508 | A * | 2/1923 | Kemp | 301/67 |
| 3,008,770 | A * | 11/1961 | Mueller | 301/95.106 |
| 3,999,587 | A * | 12/1976 | Mitchell | 152/379.4 |
| 4,150,854 | A * | 4/1979 | Lohmeyer | 301/58 |
| 5,435,368 | A * | 7/1995 | Lust | 152/381.6 |
| 7,040,365 | B2 * | 5/2006 | Lust | 152/381.5 |
| 2002/0060494 | A1 * | 5/2002 | Leo et al. | 301/67 |

FOREIGN PATENT DOCUMENTS

| | | |
|---|---|---|
| DE | 37 15 669 A1 | 1/1988 |
| DE | 41 43 380 A1 | 5/1993 |
| EP | 14097 A1 * | 8/1980 |
| JP | 60038201 A * | 2/1985 |
| JP | 61-54302 A | 3/1986 |
| JP | 09254601 A * | 9/1997 |
| WO | WO 2006/038239 A1 | 4/2006 |

OTHER PUBLICATIONS

Machine Translation of JP 09254601A.*
International Search Report for PCT International Application No. PCT/EP2007/060656, mailed Jan. 16, 2008.

* cited by examiner

*Primary Examiner* — Kip T Kotter
(74) *Attorney, Agent, or Firm* — RatnerPrestia

(57) ABSTRACT

A spoke wheel including an assembly of spokes and corresponding nipples for connecting a wheel hub and a rim to each other, wherein the nipples are held axially in corresponding seats of the rim by an axial locking assembly including a belt closed in a ring on the rim behind the nipples so as to hold them in the respective seats.

13 Claims, 3 Drawing Sheets

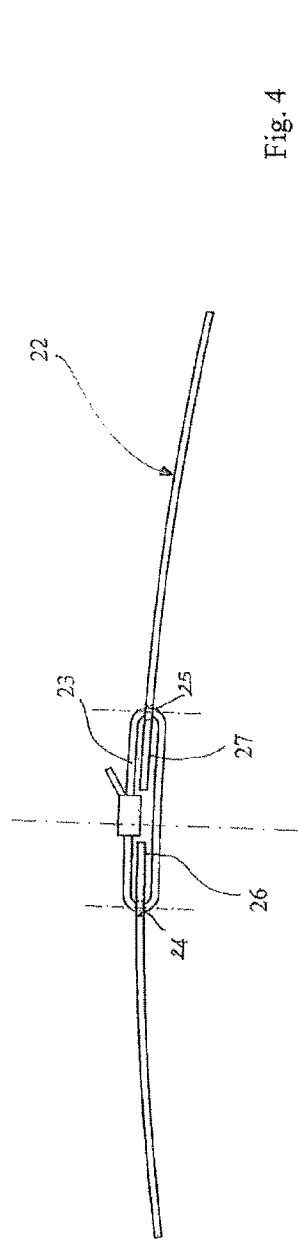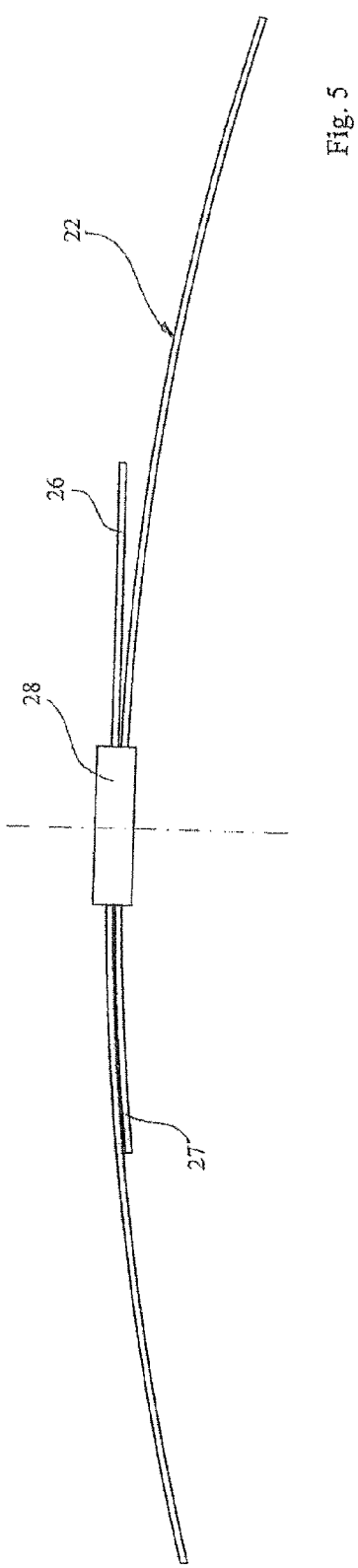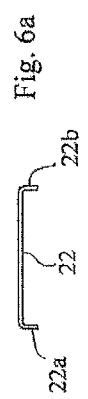

SPOKE WHEEL

This application is a U.S. National Phase Application of PCT International Application No. PCT/EP2007/060656, filed Oct. 8, 2007.

FIELD OF THE INVENTION

The subject of the invention is a spoke wheel comprising an assembly of spokes and corresponding nipples for connecting a wheel hub and a rim to each other and wherein the nipples are held axially in corresponding seats of the rim by axial locking means, sealing means being provided between the nipples and the corresponding seats of the rim.

The invention preferably refers to a wheel of the type comprising a rim and a hub secured to each other by means of a plurality of spokes, each including a stem at the opposite axial ends of which respective anchorage elements are arranged, capable of being secured respectively to the hub and to the rim.

BACKGROUND OF THE INVENTION

A wheel including such characteristics lends itself to the fitting of tubeless tyres, for example according to the teaching of Patent Application WO 2006/038239by the same Applicant.

Such a wheel provides for the use of a plurality of spokes, each of which is coupled to a nipple received in a sealed manner, with coupling of the cylinder/piston type, in a corresponding seat provided on the rim.

The coupling, preferably threaded, between spoke and nipple makes it possible to adjust the length of the spoke/nipple assembly, thus permitting the setting of the wheel.

SUMMARY OF THE INVENTION

A principal problem when producing such a wheel is that of producing a device capable of ensuring the axial position of the spoke, without preventing the rotary movement thereof that is indispensable for setting. It is further desirable for the nipple to be held in the appropriate seat of the rim with the facility for small axial movements consequent upon the deformation of the rim, without this "pumping" effect compromising the seal of the nipple/rim coupling essential for the fitting of tubeless tyres.

These problems are solved by a wheel including a spoke and nipple assembly produced according to the claims which follow.

BRIEF DESCRIPTION OF THE DRAWINGS

The characteristics and advantages of the invention will become clearer from the detailed description of some exemplary embodiments thereof, illustrated by way of non-limiting example with reference to the appended drawings, in which:

FIG. 4 is a diagrammatic view of a detail of a spoke wheel produced according to the present invention;

FIG. 5 is a diagrammatic view of a constructional variant of the detail of FIG. 4;

FIGS. 6a-6c show simplified sectional side views of a detail of the wheel of FIG. 1.

DETAILED DESCRIPTION

In FIGS. 1 to 3a, the reference 1 indicates as a whole a spoke wheel, shown only partially and produced according to the invention.

Figure 1:
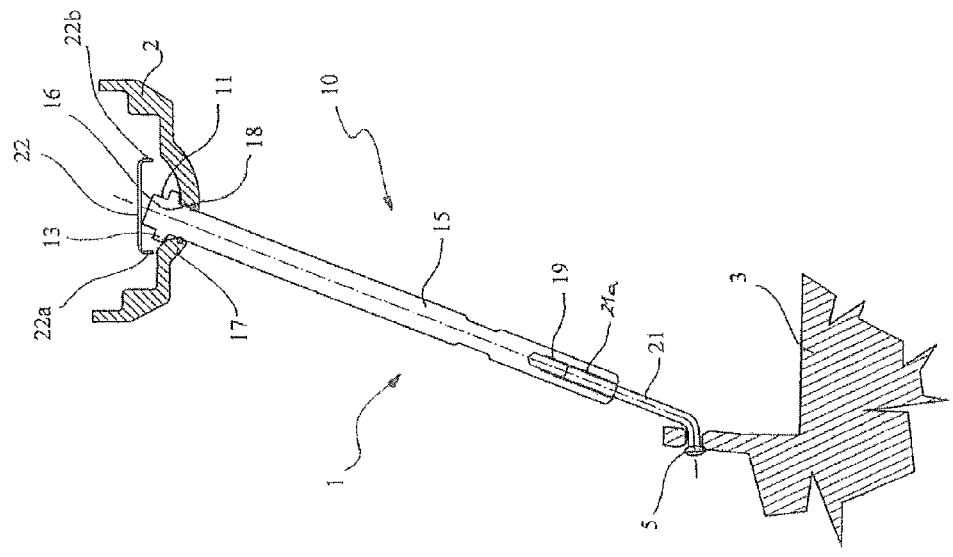
FIG. 1 is a diagrammatic sectional view of a portion of a spoke wheel produced according to a first exemplary embodiment of the present invention.
Figure 2:
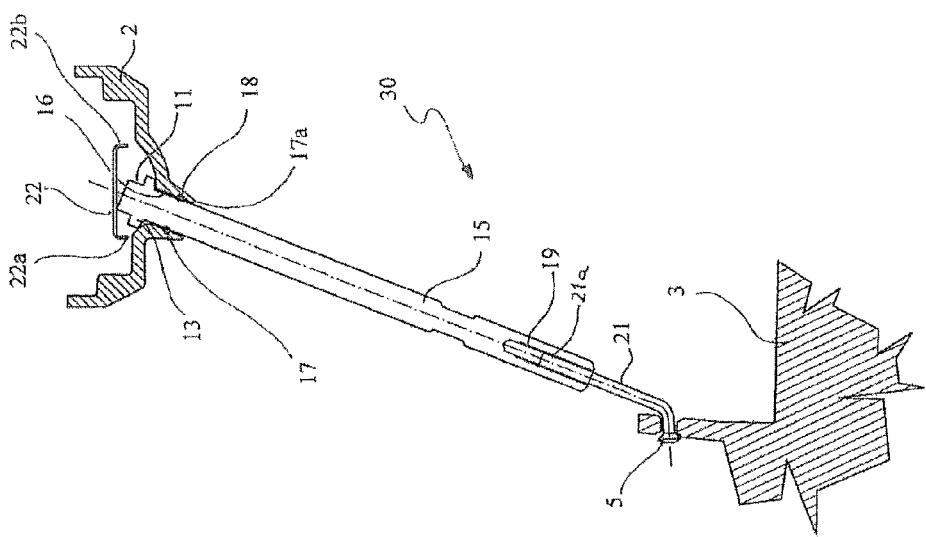
FIGS. 2, 3 and 3a are three diagrammatic sectional views of portions of three respective alternative embodiments of a spoke wheel according to the invention.
Figure 3:
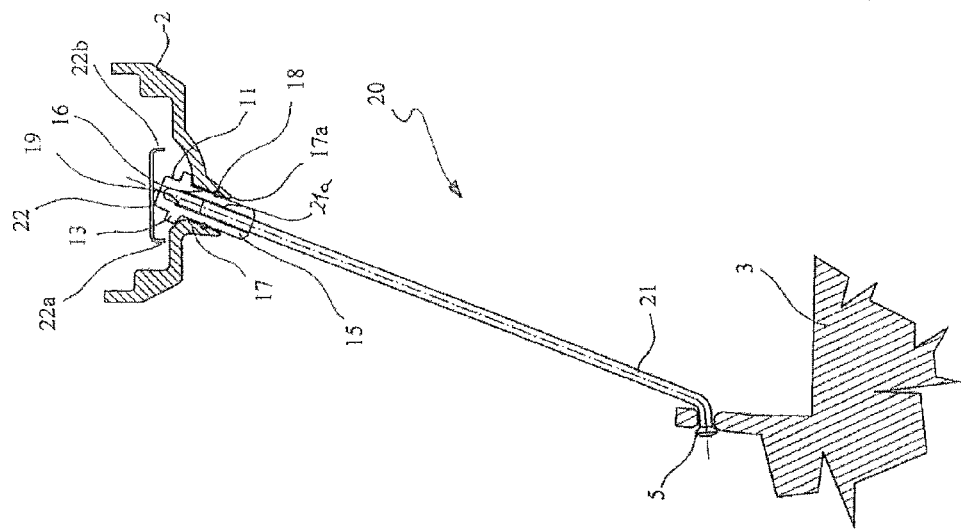
Figure 3A:
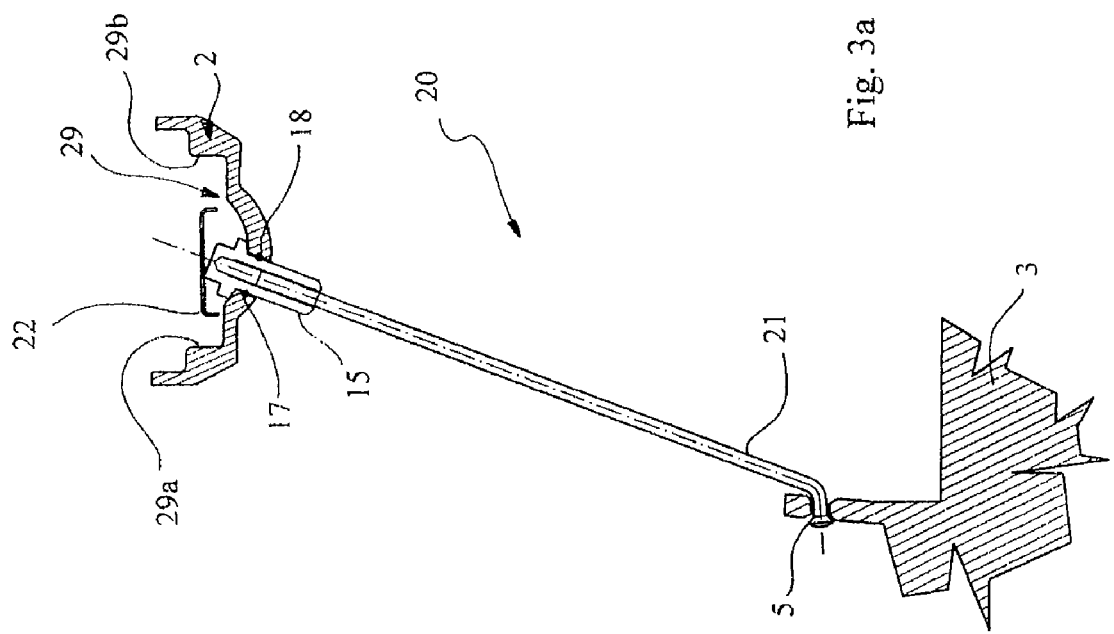

The wheel 1 comprises a rim 2 and a hub 3, joined to each other via an assembly of spokes and corresponding nipples, which assembly is indicated respectively by 10 in the first example of FIG. 1, by 20 in the second example of FIGS. 3 and 3a, and by 30 in the third example of FIG. 2.

Analogous or technically equivalent details will be indicated by the same reference numbers in the three examples described herein.

A special feature of the examples of FIGS. 1 and 2 is that the nipple is extended for a predominant length of the nipple-spoke assembly to define, in practice, the stem of the spoke itself.

In all the examples, the nipple comprises at one of its ends a head 11 on which an operating key (not shown) is provided, for example polygonal or recessed hexagonal, or slotted or cross-cut. At the root of the head 11 a flange 13 is provided, constituting an abutment member by which the nipple is held inside a channel 29 of the rim 2 in abutment against this latter. Starting from the flange 13, a stem 15 extends which is substantially cylindrical and of circular cross-section.

The stem 15 is coupled to the wall 16 of a seat 17, preferably cylindrical, of circular cross-section, provided on the rim 2.

Acting between the wall 16 of the seat 17 and the stem 15 are sealing means which make it possible to provide a coupling between nipple and seat substantially of the cylinder/piston type.

In the exemplary embodiments of FIGS. 1 to 3a, the sealing means comprise a gasket 18, of the O-ring type, interposed between the stem 15 and the wall 16.

This embodiment lends itself to the construction of wheels intended for fitting tyres without an inner tube, known as "tubeless". The wheel 1 also lends itself however to the use of tyres of conventional type.

In the exemplary embodiments of FIGS. 2 and 3, the seat 17 comprises a portion provided in a collar 17a extending and protruding radially in the direction of the hub 3.

The seat 17 may preferably, but not exclusively, be obtained by drilling the rim 2 by means of a fusion bit, or of the type in which the metal of the rim is partially melted at the drilling zone and transported in the direction of penetration of the bit to form the collar 17a. As an alternative, however, it is possible to use conventional drilling with consequently limited extension of the collar 17a.

At the distal end of the stem 15 with respect to the flange 13, a threaded axial hole 19 is provided in which engages a threaded portion 21a of a tie-rod 21, further connected by the opposed free end to the hub 3.

The tie-rod 21 and the stem 15 constitute as a whole the stem of the spoke and are arranged one in axial prolongation of the other.

The tie-rod 21 has at a free end thereof a head 5, there being intended by this term any kind of shaping which is suitable for axially locking the tie-rod 21 in a suitable opening in the hub 3.

The wheel is adjusted in this case by varying the screwed state of the tie-rod 21 in the hole 19.

Preferably, the nipple with the corresponding stem 15 of the examples described above is produced integrally from aluminium alloy or another light alloy, or from composite materials based on carbon fibre or with organic or metallic matrix, while the tie-rod 21 is preferably made of steel.

The nipples are held axially in the corresponding seats 17 of the rim 2 by means of axial locking means, comprising a belt 22, 22', 22" closed in a ring in the channel 29 of the rim behind each of the heads 11 of the nipples.

In the preferred examples of FIGS. 1-3a, the belt 22 has a cross-section comprising a band-like portion with opposed lateral edges 22a, 22b substantially perpendicular to the band-like portion, bent over in the direction of the head of the nipple 11 in order to prevent the loss of contact with the heads 11 of the nipples by lateral sliding, as detailed hereinafter.

Alternatively, as can be seen in FIGS. 6a-6c, the belt 22', 22" may be devoid of the lateral edges 22a, 22b (see in particular FIGS. 6b and 6c). In cross-section, the belt 22', 22" is therefore configured substantially as a flat metal strip, of variable thickness depending on the manufacturing material.

The belt 22, 22', 22" is made of metallic or plastics material, of the same configuration but with suitably dimensioned thickness.

When being placed in position, the belt 22 is held in a transverse position by the location provided by the lateral edge 22a or 22b, which in the event of transverse displacement abuts against the head 11 of the nipple, stopping the relative sliding of the belt 22 with respect to the head 11. In the case where the belt 22', 22" does not have the aforesaid lateral edges, it is held in a transverse position by the cheeks 29a, 29b of the channel 29 defined by the rim 2. In particular, in this case, the channel 29 inside which the belt 22', 22" rests has transverse dimensions (or the distance between the two cheeks 29a, 29b) substantially comparable to those of the belt itself.

The belt 22, 22', 22" is closed in a ring by closure means which permit the adjustment of its length and tension.

According to a non-exclusive mode of embodiment of the invention, shown in FIG. 4, the belt 22, 22', 22" is closed by means of a fastener 23, for example a toothed fastener, passing through two holes 24, 25 provided at the ends 26, 27 of the belt 22.

According to another mode of embodiment, shown in FIG. 5, a fastener 28 is tightened around the superposed ends 26, 27 of the belt 22 so as to block the relative sliding thereof by friction.

The invention thus solves the problem posed, obtaining numerous advantages compared with the conventional spoke and nipple assemblies.

These include the ease of adjustment and the economy of the means by which this is achieved.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

The invention claimed is:

1. A spoke wheel comprising an assembly of spokes and corresponding nipples for connecting a wheel hub and a rim to each other and wherein the nipples have a head end and are held axially in corresponding seats of the rim by means of axial locking means, sealing means being provided between the nipples and the corresponding seats of the rim, wherein said axial locking means comprise a belt closed in a ring on the rim above the head end of the nipples so as to hold them in the respective seats with a facility for small axial movements of a stem of the head end of the nipples relative to a wall of the seat of the rim along a direction defined by a longitudinal extent of the spoke.

2. A spoke wheel according to claim 1, wherein said rim is arranged for the fitting of "tubeless" tyres.

3. A spoke wheel according to claim 2, wherein said sealing means act between the stem of the corresponding nipple and the wall of the corresponding seat with a cylinder/piston coupling between the nipple and the seat.

4. A spoke wheel according to claim 3, wherein the wall of the seat and the stem of the nipple are cylindrical and of circular cross-section.

5. A spoke wheel according to claim 1, wherein the sealing means are of the O-ring type.

6. A spoke wheel according to claim 1, wherein said seat comprises a portion provided in a collar extending and protruding from the rim radially in the direction of said hub.

7. A spoke wheel according to claim 6, wherein the sealing means are completely contained in the collar.

8. A spoke wheel according to claim 1, wherein said seat is obtained by drilling the rim by means of a fusion bit.

9. A spoke wheel according to claim 1, further comprising a fastener coupled to said belt closed in a ring for the adjustment of the length and/or tension of said ring.

10. A spoke wheel according to claim 9, wherein said fastener passes through corresponding holes, each provided in proximity to a corresponding end of said belt.

11. A spoke wheel according to claim 10, wherein the ends of said belt are superposed and said fastener blocks, by friction, the relative sliding of said ends.

12. A spoke wheel according to claim 9, wherein the ends of said belt are superposed and said fastener blocks, by friction, the relative sliding of said ends.

13. A spoke wheel according to claim 1, wherein said belt has a cross-section comprising a band-like portion provided with two lateral edges perpendicular to the band-like portion, each of said lateral edges extending in the same direction as each other.

* * * * *